US012671672B2

(12) United States Patent
Herr et al.

(10) Patent No.: US 12,671,672 B2
(45) Date of Patent: Jun. 30, 2026

(54) ASSIGNING NETWORK ADDRESSES FROM A SUBNET OF NETWORK ADDRESSES TO PODS IN A HOST NODE

(71) Applicant: INTERNATIONAL BUSINESS MACHINES CORPORATION, Armonk, NY (US)

(72) Inventors: David Anthony Herr, Cary, NC (US); Michael Gerard Fitzpatrick, Raleigh, NC (US); Grant S. Mericle, Durham, NC (US); Navya Ramanjulu, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 18/364,959

(22) Filed: Aug. 3, 2023

(65) Prior Publication Data
US 2025/0047636 A1 Feb. 6, 2025

(51) Int. Cl.
*H04L 61/5007* (2022.01)
*H04L 101/668* (2022.01)

(52) U.S. Cl.
CPC .... *H04L 61/5007* (2022.05); *H04L 2101/668* (2022.05)

(58) Field of Classification Search
CPC ........... H04L 2101/668; H04L 61/5038; H04L 61/5061
See application file for complete search history.

(56) References Cited

U.S. PATENT DOCUMENTS

| | | | | |
|---|---|---|---|---|
| 11,481,243 B1 | 10/2022 | Wang et al. | | |
| 11,848,910 B1 * | 12/2023 | Zou | ...................... | H04L 41/044 |
| 11,902,245 B2 * | 2/2024 | Tang | ................... | H04L 12/4641 |
| 11,968,180 B2 * | 4/2024 | McCord | ............. | H04L 41/0806 |
| 12,047,283 B2 * | 7/2024 | Shen | ........................ | H04L 45/38 |
| 12,101,292 B2 * | 9/2024 | Liu | ..................... | H04L 61/5061 |
| 2023/0300002 A1 * | 9/2023 | Shen | .................... | H04L 47/803 709/220 |
| 2024/0028346 A1 * | 1/2024 | Khani | ................. | G06F 9/44505 |

(Continued)

OTHER PUBLICATIONS

Chang, et al., "A Kubernetes-Based Monitoring Platform for Dynamic Cloud Resource Provisioning," Globecom 2017—2017 IEEE Global Communications Conference, Singapore, 2017, pp. 1-6.

(Continued)

*Primary Examiner* — Alex Tran
(74) *Attorney, Agent, or Firm* — Konrad, Raynes, Davda & Victor LLP; David Victor

(57) ABSTRACT
Provided are a computer program product, system, and method for assigning network addresses from a subnet of network addresses to pods in a host node. For each host node of a plurality of host nodes, a network address and a subnet of network addresses are provided for the host node. Each of the host nodes includes a different subnet of network addresses to assign to pods executing in the host node. The pods comprise units of computing deployed at the host nodes. Containers in the pods in different host nodes communicate using network addresses from the subnets of network addresses assigned to the different host nodes. A network address is assigned to a new pod at a host node from the subnet of network addresses unique to the host node including the new pod.

20 Claims, 5 Drawing Sheets

(56) References Cited

U.S. PATENT DOCUMENTS

2025/0023844 A1* 1/2025 Juneja ................. G06F 9/45558

OTHER PUBLICATIONS

"Concepts", 37 pp. [online][retrieved Jul. 11, 2023] https://kurbernetes.io/docs.concepts/_print/.

Critelli, "Kubernetes_network_stack_fundamentals_How_containers_inside_a_pod_communicate," Red Hat, Aug. 8, 2022, 9 pp., [online][retrieved Jul. 11, 2023] https://www.redhat.com/sysadmin/kubernetes-pod-network-communications.

CRITELLI_Kubernetes_network_stack_fundamentals_How_pods_on_different_nodes_communicate, Red Hat, Aug. 9, 2022, 14 pp., [online][retrieved Jul. 8, 2023] https://www.redhat.com/sysadmin/kubernetes-pod-communicate-nodes.

Treadway, "Kubernetes_networking_for_developers," IBM Corporation, August 9. 2019, 11 pp.

Grace Period Disclosure: "Hybrid networking for z/OS Containers", Michael Fitzpatrick and Paul Gartman, SHARE 2023 Winter Technical Conference, Session 18872, Mar. 8, 2023, pp. 1-30.

"Containernetworking / cni", 27 pp., [online][retrieved Jul. 11, 2023] https://github.com/containernetworking/cni/blob/main/SPEC.md.

* cited by examiner

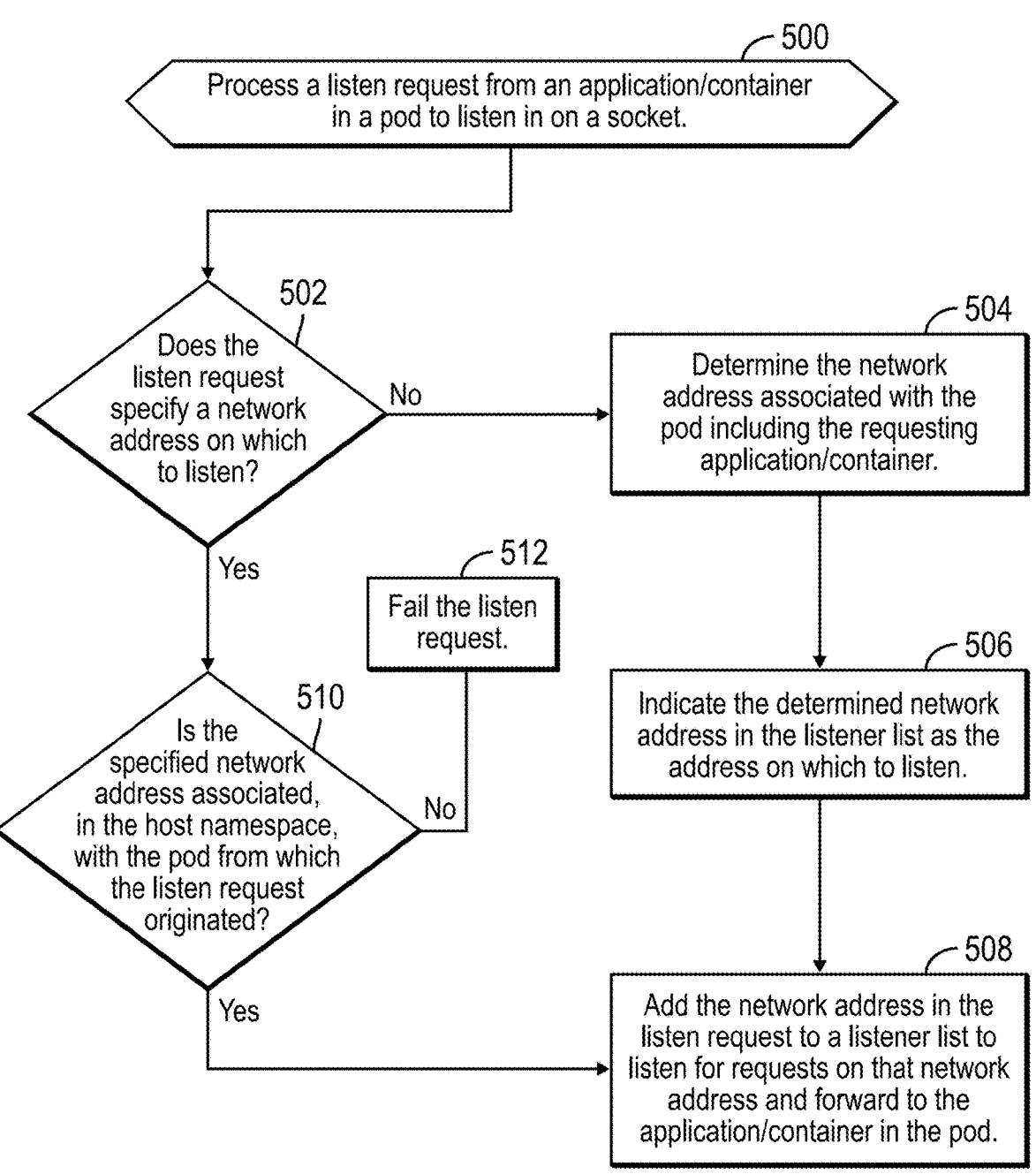

500

Process a listen request from an application/container in a pod to listen in on a socket.

502

Does the listen request specify a network address on which to listen?

No

504

Determine the network address associated with the pod including the requesting application/container.

Yes

512

Fail the listen request.

510

Is the specified network address associated, in the host namespace, with the pod from which the listen request originated?

No

506

Indicate the determined network address in the listener list as the address on which to listen.

Yes

508

Add the network address in the listen request to a listener list to listen for requests on that network address and forward to the application/container in the pod.

ASSIGNING NETWORK ADDRESSES FROM A SUBNET OF NETWORK ADDRESSES TO PODS IN A HOST NODE

STATEMENT REGARDING PRIOR DISCLOSURES BY THE INVENTOR OR A JOINT INVENTOR UNDER 37 C.F.R 1.77(b)(6)

The following Disclosure is submitted under 35 U.S.C. 102(b)(1)(A): "Hybrid networking for z/OS Containers", Michael Fitzpatrick and Paul Gartman, SHARE 2023 Winter Technical Conference, Session 18872, Mar. 8, 2023, pp. 1-30. A copy of this Disclosure is included in an Information Disclosure Statement filed concurrently with the Application. On Mar. 8, 2023, one of the inventors of the present application, Michael Fitzpatrick, presented the content of this Disclosure at the SHARE 2023 conference. The title page of this Disclosure names Paul Gartman. Paul Gartman assisted with the presentation and assembly of the slides in the Disclosure. Paul Gartman is not an inventor of the subject matter of the present application.

BACKGROUND OF THE INVENTION

1. Field of the Invention

The present invention relates to a computer program product, system, and method for assigning network addresses from a subnet of network addresses to pods in a host node.

2. Description of the Related Art

In a Kubernetes network, a cluster comprises a plurality of host nodes, each capable of running one or more pods in which applications and containers run. Host nodes in a cluster communicate over a network infrastructure. Each host node may further implement a private network infrastructure to assign network addresses to the pods in a host node. This private network is overlayed onto the host network infrastructure and isolated from the host node network infrastructure used by the host nodes. In a host node, the overlayed private network virtualizes the network stack where each namespace has a private set of Internet Protocols (IP) addresses, its own routing table, socket listing, connection tracking table, firewall, and other network-related resources. Applications running within pods have no knowledge/awareness of local network traffic from applications running natively/directly on the host or in other pods. In Kubernetes, a kube-proxy and iptables are used to handle muting and load balancing of pod network traffic in the private network. The host interacts with a private network infrastructure using a Container Network Interface (CNI). The CNI overlays the underlying network infrastructure by assigning a private subnet to each host node. The CNI bridge allows for pod-to-pod communication between hosts across the Kubernetes cluster by encapsulating the IP packets containing private source and destination IP addresses with an IP packet that contains the source and destination host IP addresses.

Pods that get deployed as part of a workload are started on a host node called a worker node. As these pods are started, they create their own network namespace and are assigned an IP address from the CNI-assigned subnet. For example, host nodes may be assigned a host network address, e.g., 192.168.1.1, and pods on that host node may be assigned private network addresses from a subnet, such as 10.244.1.0/24.

In Kubernetes host networking, pods in a host node are assigned the host network address rather than a private network infrastructure. The host network controls whether a pod may use the host's network namespace.

SUMMARY

Provided are a computer program product, system, and method for assigning network addresses from a subnet of network addresses to pods in a host node. For each host node of a plurality of host nodes, a network address and a subnet of network addresses are provided for the host node. Each of the host nodes includes a different subnet of network addresses to assign to pods executing in the host node. The pods comprise units of computing deployed at the host nodes. Containers in the pods in different host nodes communicate using network addresses from the subnets of network addresses assigned to the different host nodes. A network address is assigned to a new pod at a host node from the subnet of network addresses unique to the host node including the new pod. The containers in pods other than the new pod communicate with containers in the new pod using the network address assigned to the new pod.

BRIEF DESCRIPTION OF THE DRAWINGS

FIG. 5 illustrates an embodiment of operations to process a listen request to listen in on a network address from an application/container in a pod on a host node.

DETAILED DESCRIPTION

Described embodiments provide improvements to network technology for assigning network addresses to pods on host nodes in a network by implementing, in the network layer of each host node, a host namespace having a unique subnet of network addresses, unique across all host nodes in the network, to assign to the pods in the network. The network addresses from the subnet are assigned to specific pods to use those network addresses to communicate with other pods and receive communications from other pods or native applications throughout the cluster. Further, described embodiments allow the same port numbers to be assigned to applications and containers in any host node, where a combination of the pod network address and the assigned port number uniquely identify the application/container in that pod across all host nodes in the network.

The term "pod" as used herein refers to a smallest deployable unit of computing that can be created and managed in the network environment. A pod may refer to a deployable unit of computing in which containers execute and may also refer to a container. The term "native application" as used herein refers to an application executing in a host or worker node that is not executing within a pod.

Described embodiments allow for access to all pods throughout the host nodes to other host nodes by using subnets of addresses from the host network, and without having to overlay a private network onto each host node to use for assigning network addresses. Isolation is provided by associating each assigned network address to a pod so other pods may not use that network address to communicate and to make requests in the network. In this way, described embodiments provide isolation without the need for network overlays to support a private network.

With described embodiments, each pod in a host node receives a unique dynamic network address, such as a virtual IP address, as they are started on a host node. Each container in the pod uses this same network address. The network stack in the host node operating system, such as a TCP/IP stack, manages the network address assigned to the pod during pod creation and termination. Network isolation is provided by assigning network addresses to pods from a host node namespace, or a subnet of network addresses. A subnet, or pool of network, e.g., IP, addresses may be reserved in the network proxy layer, such as a TCP/IP. Further, only the network address assigned to a pod is available to an application within that pod. All sockets created from applications within a pod are implicitly bound to the pod's assigned a network address. This allows each pod on the node to have its own set of port numbers, without having to coordinate port allocation with other native applications on the host or applications within other pods on the same node.

Figures 1, 2:
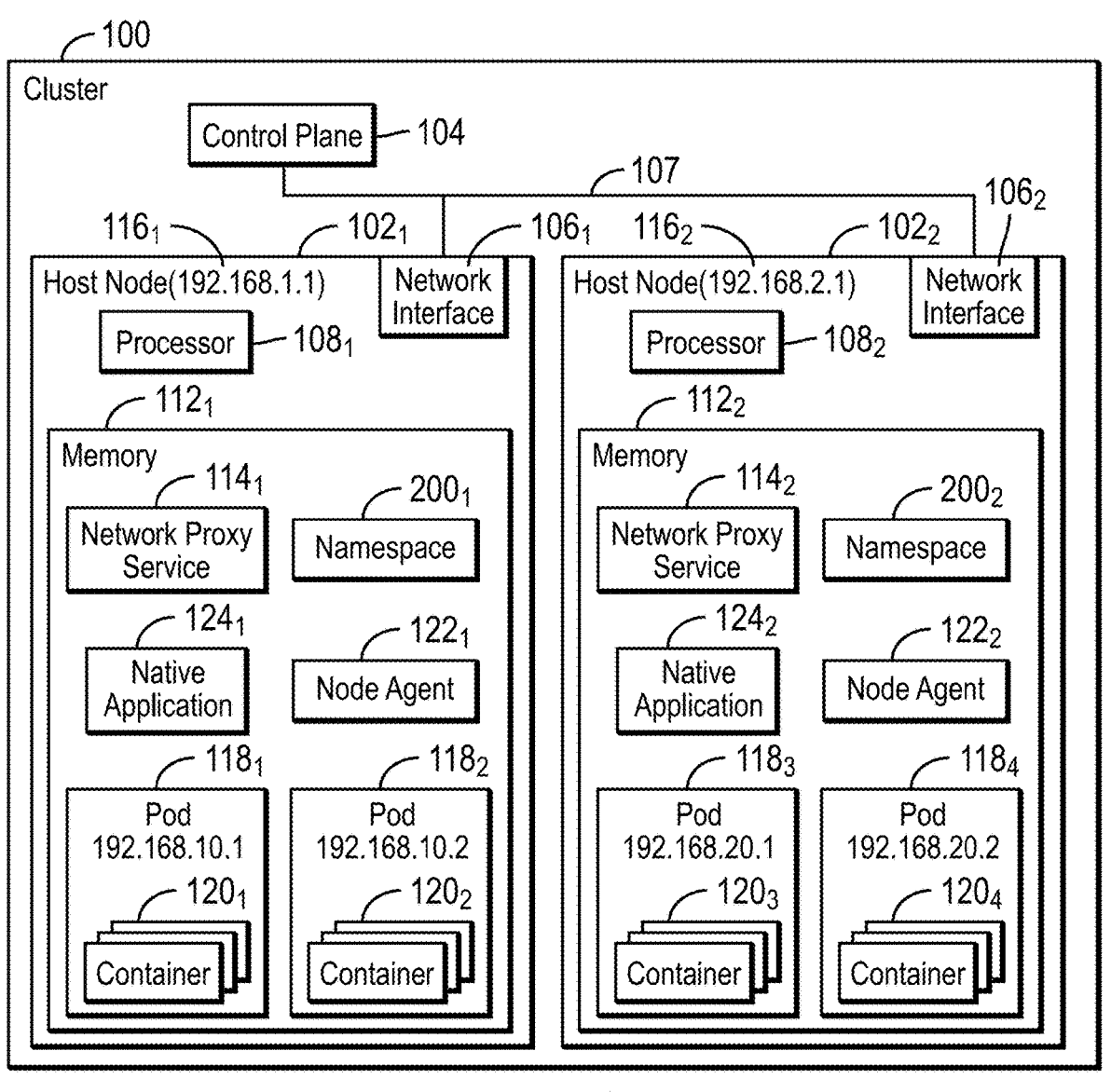
FIG. 1 illustrates an embodiment of a cluster of worker nodes.
FIG. 2 illustrates an embodiment of a pod namespace entry for a pod in a host namespace.

FIG. 1 illustrates an embodiment of a cluster $100$ of host nodes $102_1$ and $102_2$ that may comprise virtual machines or physical machines and a control plane $104$ having the components that manage the nodes $102_1$ and $102_2$ in the cluster $100$. In certain embodiments, the cluster $100$ may comprise a Kubernetes cluster. Each host node $102_1$, $102_2$ includes a network interface $106_1$, $106_2$ to communicate on a network $107$, a processor $108_1$, $108_2$, and memory $112_1$, $112_2$. The memory $112_1$, $112_2$ includes a network proxy service $114_1$, $114_2$ to assign network addresses from a namespace $200_1$, $200_2$ of network addresses, including the host network address $116_1$, $116_2$, shown as 192.168.1.1 and 192.168.2.1, and a subnet of network addresses, e.g., 192.168.10.0/24, 192.168.20.0/24 to assign to pods $118_1$, $118_2$, $118_3$, $118_4$ running in the memory $112_1$, $112_2$. The subnets of network addresses to assign in host nodes may be configured by a network administrator. The network proxy service $114_i$ may be implemented in a network stack of the host node $102_i$ operating system, such as a Transmission Control Protocol/Internet Protocol (TCP/IP) stack. The network addresses $116_1$, $116_2$ may be assigned to the network interface $106_1$, $106_2$. For instance, the network proxy service $114_1$ assigns network addresses 192.168.10.1 and 192.168.10.2, from the subnet of network addresses 192.168.10.0/24 for host node $102_1$, to pods $118_1$, $118_2$ and the network proxy service $114_2$ assigns network addresses 192.168.20.1 and 192.168.20.2, from the subnet of network addresses 192.168.20.0/24 for host node $102_2$, to pods $118_3$, $118_4$. In certain embodiments, the network proxy service $114_i$ comprises a TCP/IP network stack. The network proxy service $114_i$ manages the host namespace $200_i$ and allows communication across pods throughout the nodes within the cluster $100$ and from other clusters.

The subnet of network addresses for a host node $102_i$ may comprise dynamic virtual IP addresses (DVIPA). All containers running in the pod share the same network address, DVIPA, in the host network namespace $200_i$. Although the host network namespace $200_i$ is used, possible collisions with native application $124_i$ running on the host $102_i$ or in other pods in the same or a remote host node that might be using the same port numbers is eliminated. The network address, e.g., DVIPA, assigned to the pod $118_i$ is automatically bound to connections originating from or targeting the pod $118_i$. No other applications on the host or in other pods can use this network address as their source network address. This provides a form of network isolation with the pod and anything else that may be running on this host $102_i$ or other host nodes.

Pods $118_1$, $118_2$, $118_3$, $118_4$ comprise program environments that host and manage and execute containers $120_1$, $120_2$, $120_3$, $120_4$ that run applications. A container $120_i$ includes libraries, dependencies, and other resources necessary for an application to function independently. A pod $118_i$ provides a wrapper with dependencies to allow management of containers $120_i$ that run in the pod $118_i$. The node $102_i$ comprises a physical or virtual machine that hosts one or more pods $118_i$, each pod having one or more containers. The control plane $104$ controls pod scheduling and placement. The cluster $100$ comprises a group of worker nodes $102_1$, $102_2$. Although only two nodes each with two pods are shown, there may be thousands of nodes in a cluster $100$, each have many pods that run different configurations.

Node agents $122_1$, $122_2$ instantiate and manage pods $118_i$ in their respective nodes $102_1$, $102_2$, and manage and instantiates containers $120_i$ in the pods $118_1$, $118_2$. In certain embodiments, the node agents $122_i$ may comprise kubelets in the Kubernetes architecture.

In described embodiments, a host node $102_i$ namespace $200_i$ comprises the network address of the host node $102_i$, such as 192.168.1.1 and 192.168.2.1, and the unique subnet of network addresses available at each node $102_i$ to assign to pods $118_i$ in the nodes $102_i$, such as subnet of 254 network addresses 192.168.10.0/24 for host node $102_1$ and a subnet of 254 network addresses 192.168.20.0/24 for host node $102_2$.

Within a host node $102_i$, port numbers are available to assign to applications and containers $120_i$ running in a pod $118_i$. For instance, there may be 64K port numbers available to assign to each pod $118_i$, such that an application or container running in a pod $118_i$ may be identified by the network address of the pod $118_i$ in which the application or container runs, and the port number assigned to that application/container in the pod $118_i$. The same port numbers may be assigned to native applications and containers in pods $118_i$ throughout the nodes $102_i$. Each node $102_i$ may broadcast the network addresses assigned to pods throughout the cluster $100$ to all the other nodes $102_i$ so that nodes may communicate directly with applications/clusters in pods directly using the assigned network addresses that are unique throughout the cluster $100$. In this way, the nodes in the clusters may use the assigned network addresses in the same larger cluster namespace without any additional private network layers.

FIG. 2 illustrates an embodiment of an instance of a pod namespace entry $200_{i,j}$ for host node i and network addresses assigned to a pod j in host i, which includes a unique pod identifier (ID) $202$, such as a world-wide identifier unique across all clusters, including cluster $100$; a network address $204$ from the subnet of network addresses assigned to the node $102_i$; and port number assignments $206$ of port numbers assigned to applications and containers running in the pod $202$. Each application and container may be addressed by the different nodes $102_i$ in the cluster using the network address 204 assigned to the pod $118_i$ in which the application/container runs in combination with the port number assigned to that application/container in that pod.

The program components of FIG. 1, including components $114_1$, $114_2$, $118_1$ . . . $118_4$, $120_1$ . . . $120_4$, $122_1$, $122_2$ may comprise program code loaded into the memory 112; and executed by one or more processors $108_i$. Alternatively, some or all of the functions may be implemented as microcode or firmware in hardware devices, such as in Application Specific Integrated Circuits (ASICs).

The memory $112_1$, $112_2$ may comprise a suitable volatile or non-volatile memory to implement the components of the host node.

Figures 3, 4:
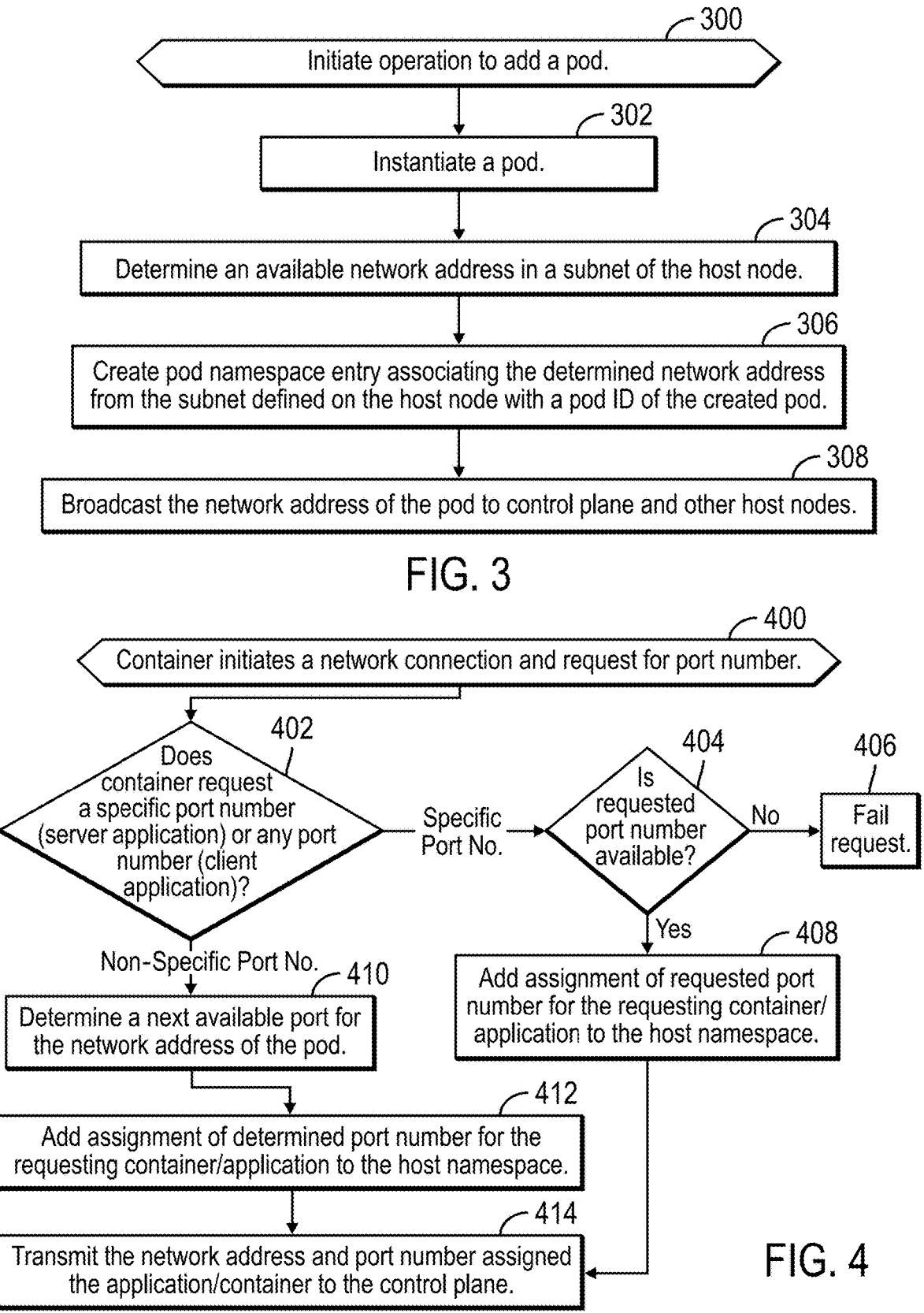
FIG. 3 illustrates an embodiment of operations to assign a network address to a pod instantiated in a host node.
FIG. 4 illustrates an embodiment of operations to assign a port number to an application or container instantiated in a pod in a host namespace.

FIG. 3 illustrates an embodiment of operations performed by the network proxy service $114i$ and node agents $122_i$ to add a pod $118_i$. Upon the node agent $122_i$ initiating (at block 300) an operation to add a pod $118_i$ at a host node $102_i$ the node agent $122_i$ instantiates (at block 302) a pod $118_i$. The network proxy service $114_i$ determines (at block 304) an available network address in a subnet of the host node, e.g., 192.168.10.1. The network proxy service $114_i$ creates (at block 306) a pod namespace entry $200_i$ associating the determined network address from the subnet defined on the host node with a pod ID 202 of the created pod. The network address assigned to the pod $118_i$ is broadcasted (at block 308) to the control plane 104 and other nodes $102_j$ to allow processes in other nodes $102_j$ to communicate with applications in the pod 118 directly using the assigned network address.

With the embodiment of FIG. 3, any newly created pods $118_i$ in a host $102_i$ are assigned a network address from the subnet defined on the host node $102_i$ that are part of the same network namespace of the host $102_i$, so that pod $118_i$ is accessible to all other nodes $102_j$ in the cluster 100 and to other clusters accessible to the cluster 100. This allows all other components in the cluster 100 to communicate with the pod $118_i$ without having to have an overlayed network, such as a private network, manage communications to the pods and other addressable components in a host node $102_i$. Further, collisions are avoided because the network address is unique as it is from the subnet of network addresses, e.g., 192.168.10.0/24, unique to that particular host $102_i$.

FIG. 4 illustrates an embodiment of operations performed by the network proxy service $114i$ and node agent $122_i$ to assign a port number to a container $120_i$ in a pod $118_i$ or a native application $124_i$ when the container/application initiates a network connection. The container $120_i$/native application $124_i$ initiating the connection may comprise a client application or a server application. Upon a container $120_i$ initiating (at block 400) a network connection for the first time, the network proxy service $114_i$ determines (at block 402) whether the initiating container $120_i$ requests a specific port number (server application) or any port number (client application). If the container $120_i$ comprises a server container requesting a specific well known port number and if (at block 404) the requested specific port number is not available, then the network proxy service $114_i$ returns fail (at block 406) to the network connection. If (at block 404) the requested port number is available, then the network proxy service $114_i$ adds (at block 408) an assignment of the requested port number for the requesting container to the port number assignments 206 in the host namespace $200_i$ to associate the requested specific port number with the container $120_i$ initiating the network connection.

If (at block 402) the request is from a client application and is for a non-specific port number, then the network proxy service $114_i$ determines (at block 410) a next available port number for the network address of the pod $118_i$, such as one of the 64,000 available port numbers for one subnet network address. The network proxy service $114_i$ adds (at block 412) an assignment of the determined port number for the created container/application to the port number assignments 206 in the host namespace $200_i$ to associate the determined port number with the application/container $120_i$ being created. The port number and network address assigned to the container/application are transmitted (at block 414) to the control plane 104. Other host nodes $102_j$ request the assigned network address and port number for the container $120_i$ from the control plane 104 to use to communicate with the container $120i$.

With the embodiment of FIG. 4, any newly instantiated applications/containers in a pods $118_i$ can be assigned any of the 64,000 port numbers available to each subnet network address, e.g., 192.168.10.0/24 and the host node, e.g., 192.168.1.1. With the described embodiments, the same port numbers may be reused across pods $118_i$ within the same host node $102_i$ and across host nodes $102_i$, $102_j$ when combined with the unique network address of the pod or host node. This allows all other components in the cluster 100 to communicate with the application/container in a pod $118_i$ without having to utilize an overlayed network, such as a private network, to manage communications to the pods and other addressable components in a host node $102_i$. Further, collisions are avoided because the combination of the port number and network address is unique to each application/container $120_i$ throughout the cluster 100 network as it is from the subnet of network addresses, e.g., 192.168.10.0/24, unique to that particular host $102_i$ and port number for the unique network address.

When a pod $118_i$ or container $120_i$ is removed/deleted, then the assigned network address and port number (for a container) is released and available for reassignment to a newly created pod.

FIG. 5 illustrates an embodiment of operations performed by the network proxy service $114_i$ in a host node $102_i$ to process a listen request from a server container $120_i$ in a pod $118_i$ or a native application $124_i$ running in the host node $102_i$. A listen request comprises a request to receive communications sent to a network address and port, such as a TCP/IP address, that may either specify a particular network address or any IP address defined on the host node $102_i$. For instance, a listen request on an IP address of 0.0.0.0 is a request to accept connections on all IP addresses on the host node $102_i$. A listen request may also be directed to a specific network address and port. with respect to a specific cluster. The network proxy service $114_i$ may add the network address and port in a listen request to a listen lister indicating the application/container that initiated the request to forward all requests and communications on that listen network address to the indicated application/container.

Upon the network proxy service $114_i$ receiving (at block 500) a list request from a server or client application/container, such as within a pod $118_i$ or a native application $124_i$, to listen on a socket, i.e., network address(s), if (at block 502) the listen request does not specify a specific network address on which to listen, such as for a client container/application, then the network proxy service $114_i$ determines (at block 504) the network address associated with the pod including the requesting application/container that submitted the listen request. The determined network address is indicated (at block 506) in the listen request as the network address/port number on which to listen. The network address added to the listen request is added (at block 508) to a listener list managed by the network proxy service $114_i$ to listen for requests on that network address and forward to the requesting application/container in the pod.

If (at block 502) the listen request specifies a network address on which to listen, such as for a server application/container, then the network proxy service $114_i$ determines (at block 510) whether the specified network address is associated, in the host namespace $200_i$, with the pod $118_i$ from which the listen request originated, i.e., the pod $118_i$ running the application/container that submitted the listen request. If (at block 510) the specified network address is not associated with the requesting application/container $120_i$ or pod $118_i$ from which the request initiated, in the host namespace $200_i$, then fail may be returned (at block 512) to the listen request. If (at block 510) the specified network address in the listen request is the network address provided for the requesting application/container in the host namespace $200_i$, then control proceeds to block 508 to add the network address to a listener list to forward communications on the added network address to the requesting application/container.

In further embodiments, the listen request may comprise a different type of request with respect to a network address other than a listen request, and the operations of FIG. 5 are performed to determine whether to reinterpret the request to be directed to the network address of the requesting application/container and whether to allow the request depending on whether the request specifies the network address associated with the requesting application/container.

With the embodiment of operations of FIG. 5, applications/containers may only listen on network addresses for the network address assigned to that application/container. This provides isolation to prevent an application or component from accessing communications for different applications or components. This level of security/isolation is useful because all network addresses assigned to applications/containers are broadcasted and accessible to all host nodes $102_i$ in the cluster 100, and perhaps other clusters, because there is no additional network layer, such as a private network, to provide private network addresses to containers and applications within pods.

Figure 6:
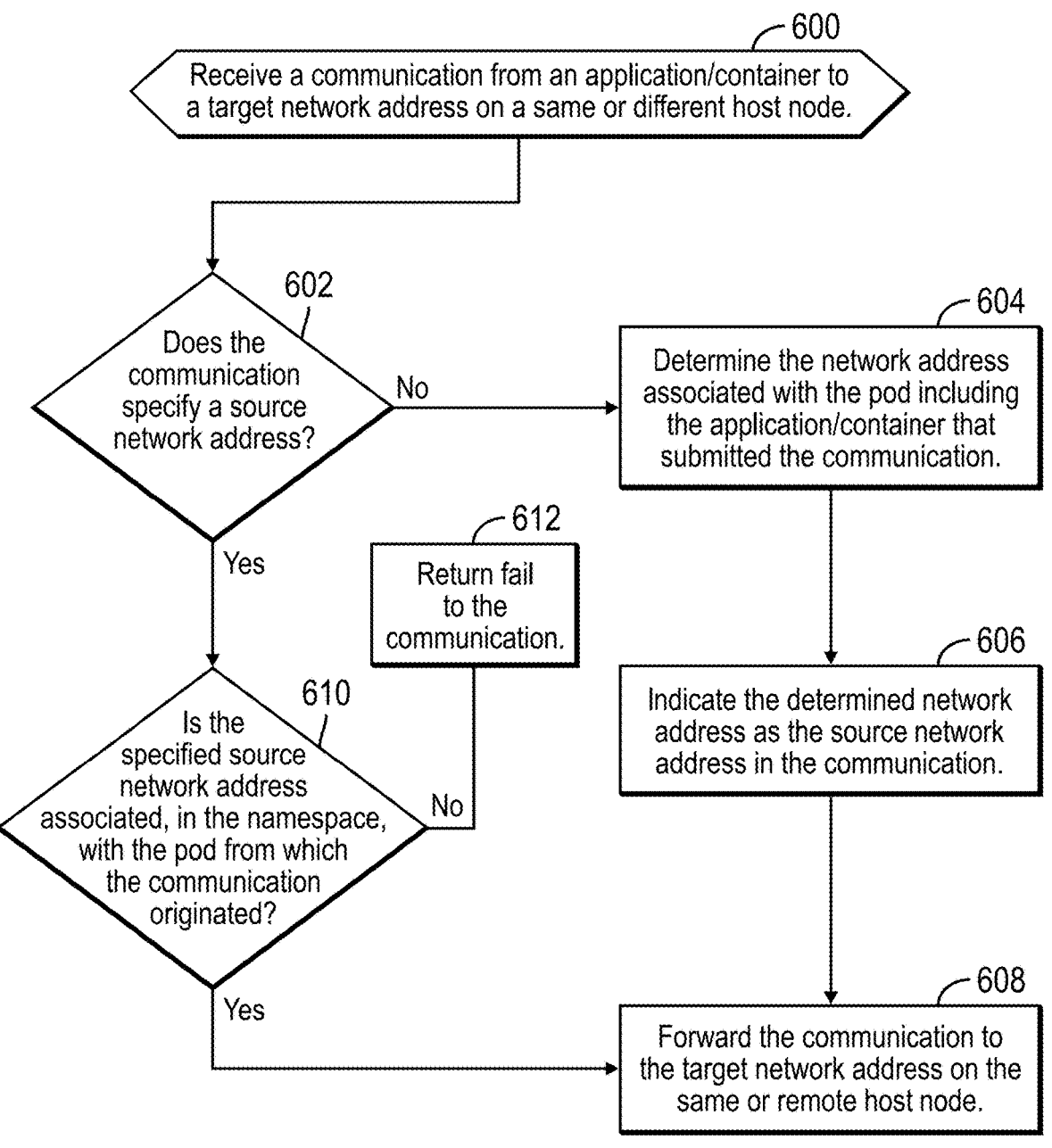
FIG. 6 illustrates an embodiment of operations to process a communication from an application/container in a pod to another application in the same or remote host node.

FIG. 6 illustrates an embodiment of operations performed by the network proxy service $114_i$ in a host node $102_i$ to process a communication received from an application/container $120_i$ in a pod $118_i$ or a native application $124_i$ running in the host node $102_i$. Upon receiving (at block 600) a communication from an application/container to a target network address, if (at block 602) the communication does not specify a source network address, such as in a TCP/IP header of the packet, then the network proxy service $114_i$ determines (at block 604) the network address associated with the pod $118_i$ including the requesting application/container that submitted the communication. The determined network address may comprise just the network address of the pod $118_i$ including the requesting application/container, e.g., 192.168.10.1, or may comprise a combination of the network address of the pod $118_i$ and the port number assigned to the requesting application/container within the pod $118_i$. For a communication from a native application $124_i$, the determined network address may comprise the host $102_i$ network address, e.g., 192.168.1.1, and may further include the port number assigned to the native application $124_i$ for the host $102_i$ network address. The determined network address is indicated (at block 606) as the source network address in the communication. The communication is then forwarded (at block 608) to the target network address on the same host node $102_i$ or remote host node $102_j$.

If (at block 602) the communication specifies a source network address, then the network proxy service $114_i$ determines (at block 610) whether the specified source network address is associated, in the host namespace $200_i$, with the pod $118_i$ from which the communication originated, i.e., the pod $118_i$ running the application/container that submitted the communication to the target network address. For a native application $124_i$, the determination may be whether the specified source network address comprises the host network address $116_i$ and may additionally consider the port number of the native application $124_i$. If (at block 610) the specified source network address is not associated with the originating application/container $120_i$ or pod $118_i$ from which the communication originated, in the host namespace $200_i$, then fail may be returned (at block 612) to the communication. If (at block 610) the specified network address in the listen request is the network address provided for the requesting application/container in the host namespace $200_i$, then control proceeds to block 608 to forward the communication to the target network address.

With the embodiment of operations of FIG. 6, applications/containers may only send communications that indicate as the source network address the network address associated with that application or container. This provides isolation and security within the host network to prevent an application or component from initiating a communication with a source network address of another component in the cluster 100, to prevent spoofing of addresses. This level of security is useful because all network addresses assigned to applications/containers are broadcasted and accessible to all host nodes 102; in the cluster 100, and perhaps other clusters, because there is no additional network layer, such as a private network, to provide private network addresses to containers and applications within pods.

The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the forego-ing. Some known types of storage devices that include these mediums include: diskette, hard disk, random access memory (RAM), read-only memory (ROM), erasable pro-grammable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electro-magnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 7:
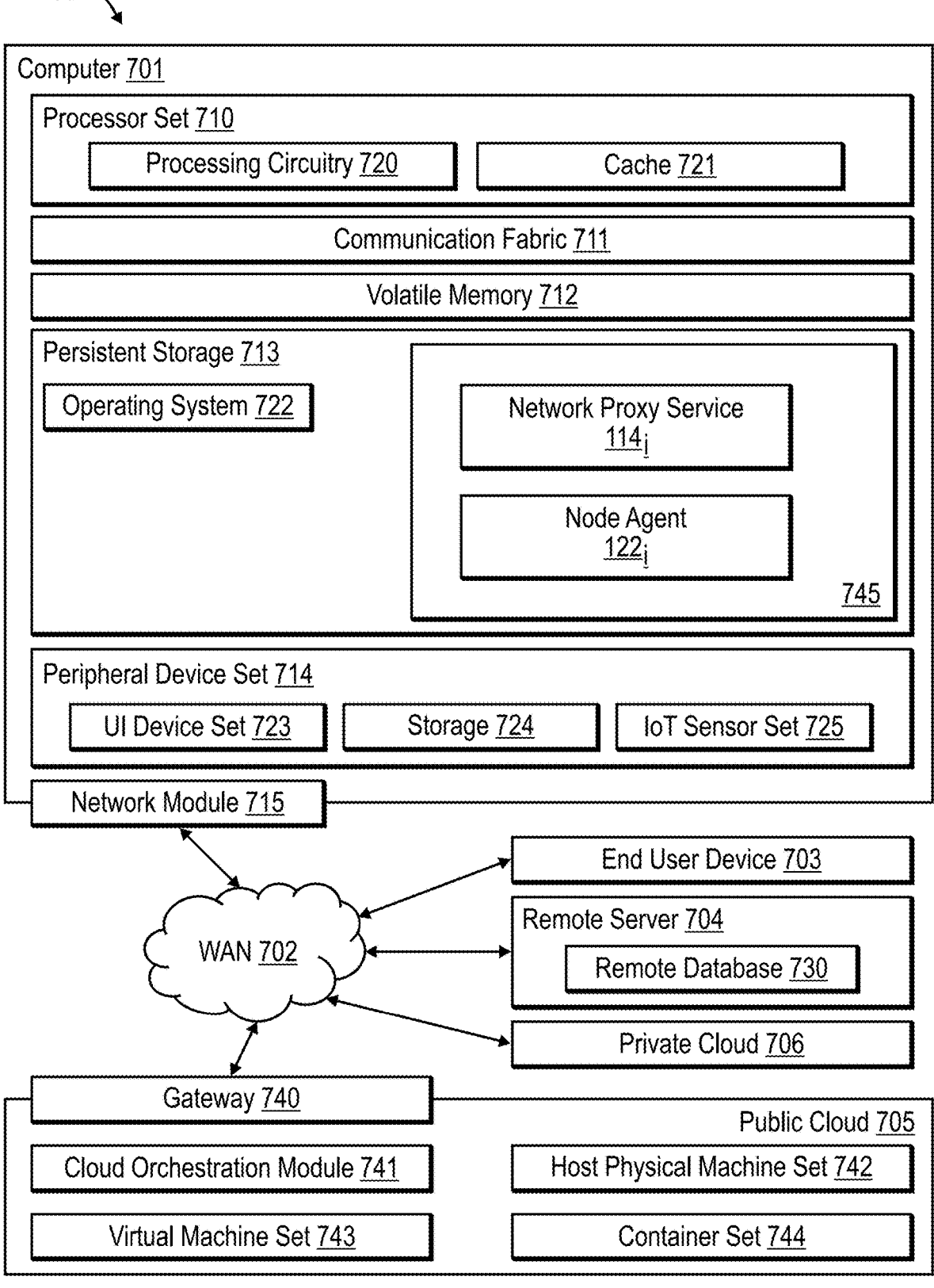
FIG. 7 illustrates a computing environment in which the components of FIG. 1 may be implemented.

With respect to FIG. 7, computing environment 700 contains an example of an environment for the execution of at least some of the computer code involved in performing the inventive methods, such as the operations for managing a host namespace in a host node as described with respect to FIGS. 1-6. Block 745 may include components of a host node 102_i_, including a network proxy service 114_i_ and a node agent 122_i_. In addition to block 745, computing environment 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and block 745, as identified above), peripheral device set 714 (including user interface (UI) device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

COMPUTER 701 may take the form of a desktop com-puter, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-imple-mented method may be distributed among multiple comput-ers and/or between multiple locations. On the other hand, in this presentation of computing environment 700, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

PROCESSOR SET 710 includes one, or more, computer processors of any type now known or to be developed in the future. Processing circuitry 720 may be distributed over multiple packages, for example, multiple, coordinated integrated circuit chips. Processing circuitry 720 may imple-ment multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative prox-imity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the meth-ods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions for performing the inventive methods may be stored in block 745 in persistent storage 713.

COMMUNICATION FABRIC 711 is the signal conduc-tion path that allows the various components of computer 701 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 712 is any type of volatile memory now known or to be developed in the future. Examples include dynamic type random access memory (RAM) or static type RAM. Typically, volatile memory 712 is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

PERSISTENT STORAGE 713 is any form of non-vola-tile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface-type operating systems that employ a kernel. The code included in block 745 typically includes at least some of the computer code involved in performing the inventive methods.

PERIPHERAL DEVICE SET 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

NETWORK MODULE 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN 702 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

REMOTE SERVER 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

PUBLIC CLOUD 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

The letter designators, such as i and j, among others, are used to designate an instance of an element or a number of instances of an element may indicate any instance of an element or a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing network addresses in host nodes, the computer program product comprising a computer readable storage medium having computer readable program code embodied therein that when executed performs operations, the operations comprising:

providing for each host node of a plurality of host nodes in a cluster, a network address for the host node and a subnet of network addresses for the host node, wherein each of the host nodes includes a unique subnet of network addresses, different from subnets of network addresses assigned to other of the host nodes, to assign to pods executing in the host node, wherein the pods comprise units of computing deployed at the host nodes, wherein containers in the pods in different host nodes communicate using network addresses from the subnets of network addresses assigned to the different host nodes, and wherein addresses assigned to the pods are unique in the cluster; and assigning, to a new pod at a host node, a network address from the subnet of network addresses unique to the host node including the new pod and unique in the cluster, wherein containers in pods other than the new pod communicate with containers in the new pod using a network address assigned to the new pod, and wherein the host nodes broadcast the network addresses assigned to the pods in the host nodes throughout the cluster to allow the host nodes throughout the cluster to communicate with the pods directly.

2. The computer program product of claim 1, wherein pods are assigned network address from a subnet for a host node, wherein each of the host nodes includes a different subnet mask of network addresses to assign to the pods in the host nodes.

3. The computer program product of claim 1, wherein a network proxy service in each host node of the host nodes manages a host name space including the subnet of network addresses, for the host node, to assign to pods created in the host node.

4. The computer program product of claim 1, wherein the operations further comprise:

assigning port numbers to applications and containers instantiated in a target pod in one of the host nodes to allow processes within any of the host nodes to communicate directly with the applications and containers in the target pod using a network address from the subnet assigned to the target pod and the port numbers assigned to the containers and applications in the target pod.

5. The computer program product of claim 1, wherein the operations further comprise:

assigning containers and applications, in different pods in the host nodes, same port numbers, wherein the containers or applications in the pods are uniquely identified throughout the host nodes by a combination of the network addresses assigned to the pods including the containers or applications and port numbers assigned to the containers or applications within the pods.

6. The computer program product of claim 1, wherein containers and applications in a pod in a given host node of the host nodes and native applications in the given host node, assigned a network address in a namespace of the given host node, are capable of being assigned port numbers assigned in other host nodes, wherein the containers and applications in a given pod of the given host node are uniquely identified throughout the host nodes by a combination of the network address assigned to the given pod including the containers and applications and the port numbers assigned to the containers and applications, and wherein the native applications in the given host node are uniquely identified throughout the host nodes by a combination of the network address of a host node assigned to the native applications and the port numbers assigned to the native applications.

7. The computer program product of claim 1, wherein the operations further comprise:

associating network addresses assigned to the pods with unique pod identifiers of the pods to which the network addresses are assigned;

receiving a request from a requesting pod with respect to a provided network address;

determining whether the provided network address is associated with a unique pod identifier of the requesting pod;

blocking the request in response to determining that the provided network address is not associated with a unique pod identifier of the requesting pod; and allowing the request in response to determining that the provided network address is associated with the unique pod identifier of the requesting pod.

8. The computer program product of claim 7, wherein the operations further comprise:

determining whether the request includes the provided network address; and including a network address, associated with the unique pod identifier of the requesting pod, in the request, in response to determining that the request does not include the provided network address, wherein the network address included in the request comprises the provided network address, and wherein the blocking and the allowing are performed in response to determining that the request includes the provided network address.

9. The computer program product of claim 7, wherein the request comprises a listening request and the provided network address comprises a network address on which to listen for requests, wherein the listening request causes communications to the provided network address to be forwarded to an application or container in the pod which submitted the listening request.

10. The computer program product of claim 1, wherein the operations further comprise:

associating network addresses assigned to the pods with unique pod identifiers of the pods to which the network addresses are assigned;

receiving a communication from a sending pod in a sending host node to transmit to a receiving pod in the sending host node or in a remote host node;

determining whether the communication provides a sending network address for the sending pod;

determining whether the sending network address is associated with the unique pod identifier of the sending pod;

failing the communication in response to determining that the sending network address is not associated with the unique pod identifier of the sending pod; and sending the communication in response to determining that the sending network address is associated with the unique pod identifier of the sending pod.

11. The computer program product of claim 10, wherein the operations further comprise:

including a network address, associated with a unique pod identifier of the sending pod, for the sending pod in the communication as the sending network address in response to determining that the communication does not provide a network address for the sending pod.

12. A system for managing network addresses in host nodes, comprising:

at least one processor; and a computer readable storage medium having computer readable program code embodied therein that when executed by the at least one processor performs operations, the operations comprising:

providing for each host node of a plurality of host nodes in a cluster, a network address for the host node and a subnet of network addresses for the host node, wherein each of the host nodes includes a unique subnet of network addresses, different from subnets of network addresses assigned to other of the host nodes, to assign to pods executing in the host node, wherein the pods comprise units of computing deployed at the host nodes, wherein containers in the pods in different host nodes communicate using network addresses from the subnets of network addresses assigned to the different host nodes, and wherein addresses assigned to the pods are unique in the cluster; and assigning, to a new pod at a host node, a network address from the subnet of network addresses unique to the host node including the new pod and unique in the cluster, wherein containers in pods other than the new pod communicate with containers in the new pod using a network address assigned to the new pod, and wherein the host nodes broadcast the network addresses assigned to the pods in the host nodes throughout the cluster to allow the host nodes throughout the cluster to communicate with the pods directly.

13. The system of claim 12, wherein pods are assigned network address from a subnet for a host node, wherein each of the host nodes includes a different subnet mask of network addresses to assign to the pods in the host nodes.

14. The system of claim 12, wherein the operations further comprise:

assigning containers and applications, in different pods in the host nodes, same port numbers, wherein the containers or applications in the pods are uniquely identified throughout the host nodes by a combination of the network addresses assigned to the pods including the containers or applications and port numbers assigned to the containers or applications within the pods.

15. The system of claim 12, wherein the operations further comprise:

associating network addresses assigned to the pods with unique pod identifiers of the pods to which the network addresses are assigned;

receiving a request from a requesting pod with respect to a provided network address;

determining whether the provided network address is associated with a unique pod identifier of the requesting pod;

blocking the request in response to determining that the provided network address is not associated with a unique pod identifier of the requesting pod; and allowing the request in response to determining that the provided network address is associated with the unique pod identifier of the requesting pod.

16. The system of claim 12, wherein the operations further comprise:

associating network addresses assigned to the pods with unique pod identifiers of the pods to which the network addresses are assigned;

receiving a communication from a sending pod in a sending host node to transmit to a receiving pod in the sending host node or in a remote host node;

determining whether the communication provides a sending network address for the sending pod;

determining whether the sending network address is associated with the unique pod identifier of the sending pod;

failing the communication in response to determining that the sending network address is not associated with the unique pod identifier of the sending pod; and sending the communication in response to determining that the sending network address is associated with the unique pod identifier of the sending pod.

17. A method for managing network addresses in host nodes, comprising:

providing for each host node of a plurality of host nodes in a cluster, a network address for the host node and a subnet of network addresses for the host node, wherein each of the host nodes includes a unique subnet of network addresses, different from subnets of network addresses assigned to other of the host nodes, to assign to pods executing in the host node, wherein the pods comprise units of computing deployed at the host nodes, wherein containers in the pods in different host nodes communicate using network addresses from the subnets of network addresses assigned to the different host nodes, and wherein addresses assigned to the pods are unique in the cluster; and assigning, to a new pod at a host node, a network address from the subnet of network addresses unique to the host node including the new pod and unique in the cluster, wherein containers in pods other than the new pod communicate with containers in the new pod using a network address assigned to the new pod, and wherein the host nodes broadcast the network addresses assigned to the pods in the host nodes throughout the cluster to allow the host nodes throughout the cluster to communicate with the pods directly.

18. The method of claim 17, wherein pods are assigned network address from a subnet for a host node, wherein each of the host nodes includes a different subnet mask of network addresses to assign to the pods in the host nodes.

19. The method of claim 17, further comprising:

assigning containers and applications, in different pods in the host nodes, same port numbers, wherein the containers or applications in the pods are uniquely identified throughout the host nodes by a combination of the network addresses assigned to the pods including the containers or applications and port numbers assigned to the containers or applications within the pods.

20. The method of claim 17, further comprising:

associating network addresses assigned to the pods with unique pod identifiers of the pods to which the network addresses are assigned;

receiving a request from a requesting pod with respect to a provided network address;

determining whether the provided network address is associated with a unique pod identifier of the requesting pod;

blocking the request in response to determining that the provided network address is not associated with a unique pod identifier of the requesting pod; and allowing the request in response to determining that the provided network address is associated with the unique pod identifier of the requesting pod.

* * * * *